US008602313B2

(12) United States Patent
Komarek et al.

(10) Patent No.: US 8,602,313 B2
(45) Date of Patent: Dec. 10, 2013

(54) DATA STORAGE MEDIUM PROVIDED WITH A SECURITY CHARACTERISTIC

(75) Inventors: Peer-Alexander Komarek, Baldham (DE); Martin Zöller, München (DE)

(73) Assignee: Giesecke & Devrient GmbH, Munich (DE)

( * ) Notice: Subject to any disclaimer, the term of this patent is extended or adjusted under 35 U.S.C. 154(b) by 75 days.

(21) Appl. No.: 12/602,554

(22) PCT Filed: May 30, 2008

(86) PCT No.: PCT/EP2008/004320
§ 371 (c)(1), (2), (4) Date: Jul. 2, 2010

(87) PCT Pub. No.: WO2008/145381
PCT Pub. Date: Dec. 4, 2008

(65) Prior Publication Data

US 2010/0270380 A1 Oct. 28, 2010

(30) Foreign Application Priority Data

Jun. 1, 2007 (DE) ......................... 10 2007 025 866

(51) Int. Cl.
*G06K 19/06* (2006.01)
*G06K 19/00* (2006.01)

(52) U.S. Cl.
USPC ............................ 235/491; 235/487; 235/494

(58) Field of Classification Search
USPC ................. 235/487, 491, 435, 454, 457, 494; 283/82, 85, 91–95
See application file for complete search history.

(56) References Cited

U.S. PATENT DOCUMENTS

| | | | | |
|---|---|---|---|---|
| 5,904,091 | A | 5/1999 | Arai | |
| 6,082,778 | A * | 7/2000 | Solmsdorf | 283/82 |
| 6,328,342 | B1 * | 12/2001 | Belousov et al. | 283/91 |
| 6,761,378 | B2 | 7/2004 | Souparis | |
| 7,078,090 | B2 | 7/2006 | Tompkin et al. | |
| 8,333,870 | B2 | 12/2012 | Burchard et al. | |
| 2004/0229022 | A1 | 11/2004 | Bourdelais et al. | |
| 2005/0006481 | A1 * | 1/2005 | Han et al. | 235/487 |

(Continued)

FOREIGN PATENT DOCUMENTS

| | | | |
|---|---|---|---|
| DE | 3906695 | A1 | 9/1989 |
| DE | 4410431 | A1 | 9/1995 |

(Continued)

OTHER PUBLICATIONS

International Search Report in PCT/EP2008/004320, Oct. 14, 2008.

(Continued)

*Primary Examiner* — Thien M Le
*Assistant Examiner* — April Taylor
(74) *Attorney, Agent, or Firm* — Workman Nydegger

(57) ABSTRACT

A multilayer data carrier having a substrate on which there is formed a security element having a metal layer, the element showing an optical effect from a viewing side. In the metal layer there are formed recesses that are not, or at best poorly, recognizable to the naked eye in daylight and form a marking. However, the presence of the marking is recognizable from a suitable viewing angle and upon suitable illumination. Preferably there is located under the metal layer a fluorescent layer which causes the marking (60) to become visible upon illumination by UV light.

21 Claims, 1 Drawing Sheet

(56) References Cited

U.S. PATENT DOCUMENTS

| | | | | |
|---|---|---|---|---|
| 2006/0006236 | A1 * | 1/2006 | Von Fellenberg et al. | 235/458 |
| 2007/0085337 | A1 | 4/2007 | Endres et al. | |
| 2007/0087173 | A1 * | 4/2007 | Endres et al. | 428/203 |
| 2007/0194934 | A1 * | 8/2007 | Tauber | 340/572.8 |

FOREIGN PATENT DOCUMENTS

| | | | |
|---|---|---|---|
| DE | 69607977 | T2 | 8/2000 |
| DE | 10064616 | A1 | 7/2002 |
| EP | 0807538 | A2 | 11/1997 |
| EP | 0956975 | A2 | 11/1999 |
| GB | 2250473 | A | 6/1992 |
| JP | 2003226085 | A | 8/2003 |
| JP | 2006-205674 | A | 8/2006 |
| WO | 9526274 | A1 | 10/1995 |
| WO | 97/18092 | A1 | 5/1997 |
| WO | 2004/028825 | A2 | 4/2004 |
| WO | 2005/048182 | A1 | 5/2005 |
| WO | 2005/053968 | A1 | 6/2005 |
| WO | 2006/066803 | A1 | 6/2006 |

OTHER PUBLICATIONS

“Mikroschrift schutzt Dokumente”, Handelsblatt, Nov. 24, 2006.
“Mikroschrift”, Wikipedia, Nov. 23, 2012.
“Optical Document Security”, van Renesse, Rudolf L. van, 2nd edition, Delft, 1989, pp. 10, 11, 18, 19, and 435.

* cited by examiner

DATA STORAGE MEDIUM PROVIDED WITH A SECURITY CHARACTERISTIC

BACKGROUND

1. Field

This invention relates to a multilayer data carrier, in particular an identification card or the like, which bears a difficult-to-forge security element which is detectable by simple means.

2. Related Art

From WO 2005/048182 A1 there is known a generic data carrier which is based on a transparent foil on which there are formed on a viewing front side in this order: a fluorescent printed layer applied by printing technology, a first foil-shaped metallic layer, a foil-shaped transparent interlayer, and a second foil-shaped metallic layer with a different ground color. The two metallic layers have recesses which are formed by means of a laser and form a marking present in the two metallic layers in exact register. The marking may be in particular a portrait. On account of the different ground colors of the two metal layers, the marking appears different upon viewing of the data carrier from the front compared to viewing from the back. Upon viewing of the data carrier from the front and simultaneous illumination of the back by UV radiation, the gaps further appear as fluorescent places.

In a variant it is further proposed to employ, instead of a transparent base foil with a printed fluorescent layer, a central carrier foil doped with fluorescent pigments having applied thereto on each side a layer sequence consisting of two vapor-deposited metallic layers and one intermediate transparent layer. The altogether four vapor-deposited metallic layers again have recesses formed therein by means of a laser which form an exactly registered marking in all four layers. Upon illumination of the central carrier foil by suitable excitation radiation, the marking appears fluorescent.

The known solution provides a difficult-to-imitate authenticity feature by making it possible to check with the naked eye the layer structure of a data carrier—namely by the presence of at least two spaced, marked layers—and the quality of the marking—by its register accuracy. However, the known solution presupposes that the two sides of the data carrier are configured so as to be coordinated with each other, thereby limiting the free designability of one surface of the data carrier. The surface space for applying other security features or identifying features is accordingly lost.

From WO 2005/053968 there is further known the proposal of forming markings in the form of patterns, letters, numbers and/or images by means of a laser in a security element having a metal layer disposed between two translucent cover layers. The markings in the metal layer show a watermark effect by which they appear in a positive representation upon viewing in transmitted light and in a negative representation upon viewing in reflected light. This solution presupposes that the security element can be viewed from two sides.

BRIEF SUMMARY

The object of the invention is to specify a data carrier having a security element that is difficult to imitate and influences the designability of the data carrier as little as possible.

The inventive data carrier has the advantage of being hardly influenced in its structure by the security element. In particular, the back can be freely designed and the security element does not require any certain layer sequence. An inventive data carrier equipped with a security element is very forgery-resistant because the production of the security element on a data carrier requires a sound mastery of materials and working methods and is therefore impossible for potential forgers to carry out without sufficient knowledge. However, the check of an inventive data carrier by the authenticity feature realized by the security element can be carried out even by laymen using simple means and is reliable.

Advantageously, the production of the inventive data carrier can be effected with per se known equipment and does not limit the designability of the data carrier. An inventive data carrier can hence readily also bear other security elements based on other mechanisms.

In an especially attractive embodiment, the security element produces an optically perceptible light refraction effect; it is executed for example as a hologram or kinegraphic element.

The inventive data carrier advantageously permits the incorporation of personalization information into the security element. If the data carrier is used for proving the identity of a person, the marking incorporated into the security element is preferably a portrait of the person. However, it is readily also possible to produce another marking structure derived from personal data of a data carrier owner. The personalization can then be advantageously effected individually on the particular data carrier. However, the production of inventive data carriers can readily also be effected by way of serial manufacturing with e.g. consecutive serial numbers being generated as the marking.

The production of the inventive data carrier is expediently effected by applying to a substrate foil a fluorescent layer, applying thereto a security element, and forming therein a marking with the help of a laser. Preferably, the fluorescent layer is applied by printing technology and superimposed completely by the security element.

DESCRIPTION OF THE DRAWINGS

An exemplary embodiment of the invention will hereinafter be explained more closely with reference to the drawing.

Therein are shown.

DETAILED DESCRIPTION OF VARIOUS EMBODIMENTS

Figure 1:
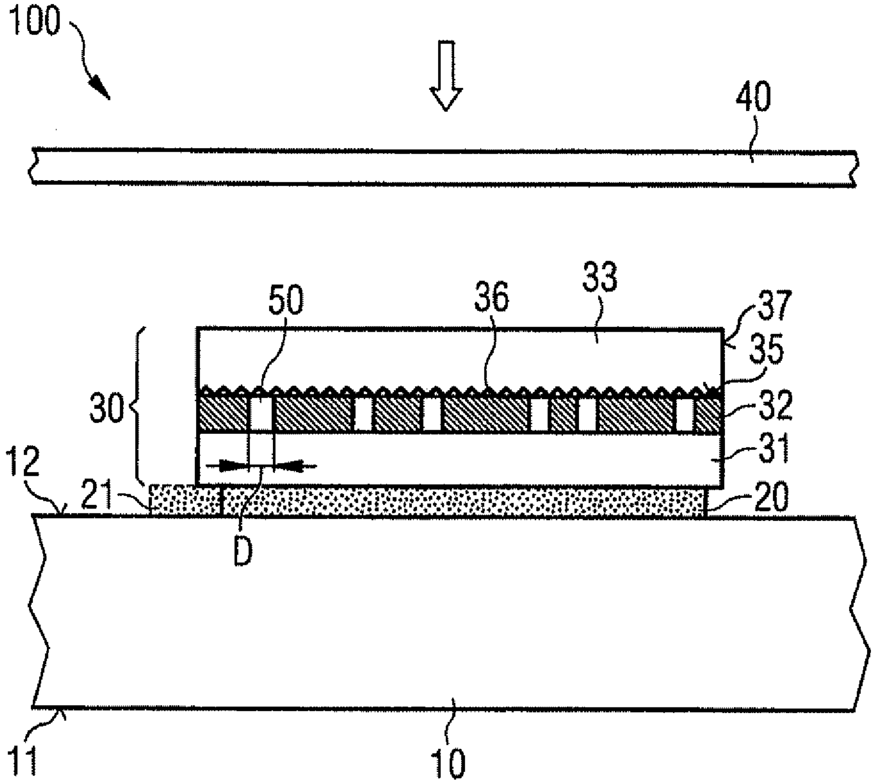
FIG. 1 a part of the layer sequence of a data carrier having a security element in cross section, FIG. 2 a data carrier having a security element, there being formed in the latter a marking which becomes visible under UV irradiation.

FIG. 1 illustrates in a cross-sectional view in the manner of an exploded view the layer sequence of an inventive data carrier 100 in the area of an inventively designed security element. Heights and thicknesses of the shown layers relative to each other are not to be understood to be to scale. On a substrate 10 there is accordingly located a fluorescent layer 20 on which there is formed a security element 30 having a structure 36 causing an optical effect. Over the security element 30 there is applied on the viewing side, which is indicated by an arrow, a cover layer 40. The cover layer 40 is shown here in an imaginary position before connecting of the layers 10, 20, 40 into a finished data carrier 100. On the finished data carrier 100 the upper side 41 of the cover layer 40 forms a level surface.

The data carrier 100 forms in particular an identification card, credit card, bank card, cash payment card or authorization card, a chip card or a personalization data page for integration into a passport. However, the data carrier 100 can also constitute a transfer element disposed on a carrier layer for application to an identification card or other object; in this case the data carrier 100 is preferably designed only on the viewing side, while bearing for example an adhesive strip on the far side.

The substrate 10 is configured to be transparent or opaque as desired and possesses a thickness of for example 100 μm to 500 μm. It expediently consists of a plastic such as PVC, polyester, ABS or polycarbonate and is preferably present in foil form for processing. The substrate 10 can consist internally of a plurality of layers and in particular bear on the surface here designated the back 11 a layer sequence adapted to the purpose of use and deviating from that on the upper side. However, there can readily also be provided on the back 11 a layer sequence constructed analogously to the layer sequence on the upper side and comprising e.g. a further security element 30 in connection with an associated further fluorescent layer and a cover layer. Alternatively to plastic, the substrate 10 can also consist of paper, a ceramic material or a glass material.

The fluorescent layer 20 is preferably applied to the substrate 10 by printing technology. It is transparent in daylight or white artificial light and covers a part of the surface 12 of the substrate 10 that is coordinated with the size of the security element 30. Normally, the surface area covered by the fluorescent layer 20 is smaller than the base area of the security element 30 and is completely covered thereby. However, it is basically also possible, as indicated in FIG. 1 by the area 21 projecting under the security element 30 on the left side, to make the fluorescent layer 20 greater in surface area than the security element 30. This is expedient e.g. when the fluorescent layer 20 supports further security features—not shown—that are formed on the data carrier 100. The material to be used for the fluorescent layer 20 may be any common fluorescent ink that is compatible with the laser technology used, which will be described below. Alternatively to application by printing technology, there can be used for producing the fluorescent layer 20 a foil that fluoresces at least in the area of the security element 30. In a variant of the inventive data carrier 100, the fluorescent layer 20 can also be omitted and the security element 30 be applied directly to the substrate 10.

The material used for the layer 20 can be, instead of a fluorescent material, also a material luminescing in a different manner, e.g. a phosphorescent one, or one excitable in another way, e.g. by temperature. It is basically possible to use any type of material that can be caused to glow by non-destructive physical excitation from outside at least under certain ambient conditions.

The security element 30 typically possesses, as indicated in FIG. 1, a multi-layer structure fundamentally consisting of three layers, there being located on a transparent, laser-transmissive base layer 31 a metallized, laser-absorbent layer and thereon a transparent, laser-transmissive final layer 33. The final layer 33 may be a foil or else a lacquer; it can also be omitted. On the surface 35 of the metallized layer 32 there is formed a structure 36 that produces an optical effect. Typically, the security element 30 possesses a thickness of 50 μm to 250 μm and is preferably greater in surface area than the fluorescent layer 20 so that it covers the latter completely.

In a user-friendly, attractive embodiment, the structure 36 comprises a diffraction pattern in the form of a hologram or a kinegraphic element which provides an angular-dependent pictorial impression to a viewer in daylight or in white artificial light in a per se known manner. Alternatively, the structure 36 can also consist in other effects based on reflection or iridescence.

The cover layer 40 is executed to be transparent at least in the area of the security element 30, so that the latter is recognizable through the cover layer 40 from the viewing side. It serves primarily to protect the security element 30 and also any other security elements present on the data carrier 100, and is basically optional, i.e. the cover layer 40 can also be omitted. Like the substrate 10, the cover layer 40 consists expediently of a suitable plastic, e.g. PVC, ABS, polyester, polycarbonate or mixtures thereof, as is known from the production of chip cards. Besides plastic, it is of course also possible to use other transparent materials, e.g. glass materials, for executing the cover layer 40.

In the metallized layer 32 there are formed recesses 50 which together produce a marking 60 in the form of a raster image. The marking 60 can consist in the reproduction of a photo, of alphanumeric characters or of any graphical patterns. Primarily upon use of the data carrier 100 as a document for identifying a person, the marking 60 is expediently a portrait of the person. The raster image forming the marking 60 is expediently located completely within the surface area of the security element 30, so that there always remains between the outside recesses and the lateral limit 37 of the security element 30 an edge on which the layers 31, 32 and 33 are continuously interconnected intimately. Said edge stabilizes the security element 30.

The size of the recesses 50 is, in an especially expedient execution, dimensioned in such a way that their cross-sectional openings D are not, or at best poorly, recognizable upon viewing of the data carrier 100 with the naked eye. Typically, the cross-sectional openings D have greatest diameters of at most 200 μm. The recesses 50 are further formed only in a density such that they do not influence the appearance of the metallized layer 32 or of the diffraction structure 36 formed on its surface 35 upon viewing with the naked eye.

The designing of the marking 60 from recesses 50 not individually recognizable to the naked eye, in connection with a distribution of the recesses 50 such that no clusters are recognizable either, has the effect that the marking 60 is not recognizable as a whole upon viewing of the data carrier 100 from the viewing side with the naked eye in daylight or normal artificial light. Rather, upon such viewing only the impression of the optical effect produced by the security element 30 is recognizable, e.g. the diffraction effect of a hologram.

Figure 2:
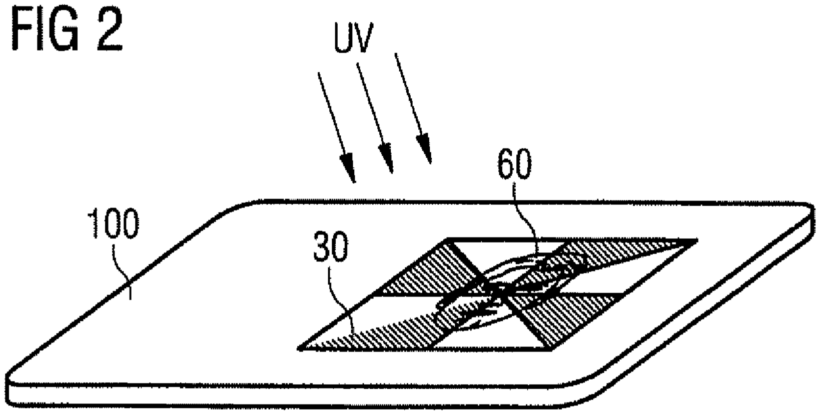

However, when the security element 30 with the marking 60 is exposed to UV light from the viewing side, as indicated in FIG. 2, this excites the fluorescent layer 20 located under the security element 30. The layer 20 thereby becomes a background illumination for the metallized layer 32 with regard to the viewing side. This now makes the recesses 50 and thus the thereby produced marking 60 perceptible upon plan viewing from the viewing side. If the marking 60 is a portrait, as indicated in FIG. 2, the latter consequently becomes visible within the security element 30 upon illumination of the data carrier 100 by UV light. Becoming visible in UV light constitutes a very forgery-resistant authenticity feature.

If the data carrier 100 does not possess a fluorescent layer 20, the authenticity feature results from the possibility of recognizing the presence of the marking 60 at least from a suitable angle and upon suitable incidence of light; angle and incidence of light can be found by experiment. In this case the recesses 50 must be dimensioned to be sufficiently large.

For production of a data carrier 100, the fluorescent layer 20 is first applied to a substrate 10 using a common printing method and employing a commercially available, suitable fluorescent ink. Thereabove the security element 30 is subsequently applied by means of a common gluing method; the security element 30 is expediently supplied as a finished half-product containing a metallized layer 32 with a structure 36 producing an optical effect already formed on its surface 35.

Over the arrangement present after application of the security element 30 a cover layer 40 is placed, if desired. The total layer configuration consisting of the layers 10, 20, 30, 40 is then connected by a conventional laminating method into a data carrier 100.

Alternatively to the use of a security element 30 in the form of a half-product, it can also be provided to singly apply base layer 31, metallized layer 32 and, if provided, the final layer 33. The metallized layer 32 here can already contain a structure 36 producing an optical effect; otherwise the structure 36 is expediently created in the metallized layer 32 after the connecting of the layers 31, 32, 33 of the security element 30. Expediently, the connecting of the layers 31, 32, 33 together with the cover layer 40 and the substrate 10 is again effected by a conventional laminating method.

In the subsequently present connected data carrier 100 the marking 60 is formed in a following processing step. For this purpose, a half-tone pattern is first generated by raster technology from an original of a marking to be formed. In so doing, different brightness levels of the half-tone pattern are generated by a different screen dot density, a different screen dot size and/or by a different screen dot blackening. The quality of the thus generated raster image plays no role here at first. The raster image can render for example a photo and have a high resolution of 300 dpi (dots per inch) or more. In a following step the initial raster image is preferably inverted, so that dark image parts become light and light image parts dark. Subsequently, the inverted raster image is converted by software means into a raster image with small dimensions, a smaller resolution and a certain, small number of grayscale values. For example, there is generated a grayscale image with dimensions of 10×12 mm that has between two grayscale values—corresponding to a black-and-white image—and at most 256 grayscale values. For the resolution a value between 70 and 120 dpi has proved expedient. The subsequently present reduced raster image is transferred into the metallized layer 32 of the security element 30 on the data carrier 100 using a conventional laser. The adjustment of the laser parameters of the laser, e.g. beam diameter and pulse energy, and the materials employed for producing the fluorescent layer 20, the security element 30 and the cover layer 40 are coordinated with each other here such that the struck areas, i.e. the recesses 50, are completely removed in the metallized layer 32 but at the same time no permanent change of material occurs in any of the other layers 10, 20, 40. Above all, the laser parameters are so chosen that the base layer 31 is not removed under the recesses 50 so as to prevent the security element 30 from being detached from the substrate 10 or from the fluorescent layer 20.

In a variant to forming the marking 60 in the security element 30 located on the substrate 10, it can be provided to already form it in a security element 30 supplied as a half-product before its application to a substrate 10.

In the exemplary embodiment, a lamp-pumped Nd:YAG solid-state laser with a pulse frequency of 50 kHz and very low pulse energy in the image mode was used for forming the marking 60; the white energy was held near the value 0. However, it is of course also possible to use other laser technologies, for example Nd:glass lasers or longer-wave $CO_2$ lasers.

While keeping to the basic idea of the invention of forming in a metal layer in which an optically effective security element is formed, through a perforation hardly recognizable to the unarmed eye, a marking that is only made clear by a subjacent layer of print, the invention permits a number of further embodiments besides those mentioned above. It is thus also possible to use for the layer 20, instead of a material to be excited to glow, a material that glows permanently quite without excitation, or at least appears very bright, e.g. a very luminous ink in comparison to the structures in the immediate surroundings, or a very reflective ink, although in such cases the perception of the marking is normally limited to plan viewing in a narrow range around an angle of 90°.

The invention claimed is:

1. A multilayer data carrier comprising:

a substrate on which there is formed a security element having a metal layer, wherein said element shows an optical effect from a viewing side, wherein an impression of the optical effect produced by the security element is recognizable upon viewing in daylight, wherein the metal layer has recesses that have diameters of at most 200 μm so that the recesses are not, or at best poorly, recognizable to the naked eye in daylight and the recesses form a marking, wherein the recesses have a distribution so that clusters of the recesses are not, or at best poorly, recognizable to the naked eye in daylight, wherein a layer is formed on the substrate under the security element, the layer comprising a material that is excitable to glow by an external nondestructive physical action applied to the data carrier in such a way that the recesses become visible upon plan viewing from the viewing side, but the material is not excitable to glow in such a way that the recesses become visible upon viewing from the viewing side by daylight applied to the data carrier.

2. The data carrier according to claim 1, wherein there is formed on the substrate under the security element a luminescent layer.

3. The data carrier according to claim 2, wherein the luminescent layer is a layer applied by printing technology.

4. The data carrier according to claim 2, wherein the luminescent layer is smaller than, or at most as large as, the security element in surface area.

5. The data carrier according to claim 1, wherein the recesses have diameters of at most 100 μm.

6. The data carrier according to claim 1, wherein the marking is formed completely within the security element.

7. The data carrier according to claim 1, wherein the security element is of multilayer configuration, the metal layer being located on a base layer.

8. The data carrier according to claim 1, wherein the substrate is opaque.

9. The data carrier according to claim 1, wherein above the security element there is formed a transparent cover layer.

10. The data carrier according to claim 1, wherein the security element has a hologram or a kinegraphic element.

11. The data carrier according to claim 1, wherein the marking shows a raster image rendering different grayscale values.

12. The data carrier according to claim 11, wherein the raster image has a resolution of from 70 to 120 dpi.

13. The data carrier according to claim 11, wherein the raster image renders from 2 to 512 grayscale values.

14. The data carrier according to claim 1, wherein the layer formed on the substrate covers a part of the substrate and is coordinated with the size of the security element.

15. A method for producing a multilayer data carrier having a substrate on which there is formed a security element having a metal layer, said element showing an optical effect from a viewing side, wherein an impression of the optical effect produced by the security element is recognizable upon viewing in daylight, comprising;

forming recesses in the metal layer that have diameters of at most 200 μm so that the recesses are not, or at best poorly, recognizable to the naked eye in daylight, the recesses forming a marking, wherein the recesses have a distribution so that clusters of the recesses are not, or at best poorly, recognizable to the naked eye in the daylight, and forming a layer on the substrate before formation of the security element, the layer comprising a material that is excitable to glow by an external nondestructive physical action applied to the data carrier in such a way that the recesses become visible upon plan viewing from the viewing side, but the material is not excitable to glow in such a way that the recesses become visible upon viewing from the viewing side by daylight applied to the data carrier.

16. The method according to claim 15, including applying a luminescent layer to the substrate before formation of the security element.

17. The method according to claim 16, including applying the luminescent layer by printing technology.

18. The method according to claim 16, including applying the security element as a half-product to the luminescent layer.

19. The method according to claim 15, including forming the recesses by means of a laser.

20. The method according to claim 15, wherein, for producing the marking, generating a grayscale image with a defined number of grayscale values which is derived from an original that is unrestricted with respect to grayscale values.

21. The method according to claim 15, wherein the layer formed on the substrate covers a part of the substrate and is coordinated with the size of the security element.

* * * * *